United States Patent
Aurongzeb et al.

(10) Patent No.: US 12,299,592 B2
(45) Date of Patent: May 13, 2025

(54) SYSTEM AND METHOD FOR IMPROVING RELIABILITY OF AN INFORMATION HANDLING SYSTEM

(71) Applicant: DELL PRODUCTS, LP, Round Rock, TX (US)

(72) Inventors: Deeder Aurongzeb, Austin, TX (US); Steven Embleton, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1040 days.

(21) Appl. No.: 17/101,754

(22) Filed: Nov. 23, 2020

(65) Prior Publication Data

US 2022/0164681 A1    May 26, 2022

(51) Int. Cl.
G06N 20/00    (2019.01)
G06F 9/455    (2018.01)
G06N 5/04    (2023.01)

(52) U.S. Cl.
CPC ........... *G06N 5/04* (2013.01); *G06F 9/45558* (2013.01); *G06N 20/00* (2019.01); *G06F 2009/4557* (2013.01)

(58) Field of Classification Search
CPC ...... G06N 5/04; G06N 20/00; G06F 9/45558; G06F 2009/4557
See application file for complete search history.

(56) References Cited

U.S. PATENT DOCUMENTS

| | | | |
|---|---|---|---|
| 9,321,101 B2 | 4/2016 | Aurongzeb | |
| 9,927,853 B2 | 3/2018 | Vichare et al. | |
| 2009/0236129 A1 | 9/2009 | Schueller et al. | |
| 2017/0046640 A1* | 2/2017 | Varadi | F24F 11/30 |
| 2017/0089607 A1* | 3/2017 | Vichare | G06F 11/3058 |
| 2018/0003615 A1* | 1/2018 | Kessler | G01N 27/04 |
| 2018/0284011 A1 | 10/2018 | Farkas et al. | |
| 2019/0286475 A1* | 9/2019 | Mani | G06F 9/45558 |
| 2019/0377625 A1* | 12/2019 | Chintalapati | G06N 7/01 |
| 2021/0073060 A1* | 3/2021 | Grant | G06F 11/3089 |
| 2021/0200616 A1* | 7/2021 | Xu | G06F 11/0751 |
| 2022/0025524 A1* | 1/2022 | Embleton | G06F 1/182 |

OTHER PUBLICATIONS

Bauer, Eric, and Randee Adams. Reliability and availability of cloud computing. John Wiley & Sons, 2012 (Year: 2012).*

Kapil, Divya, Emmanuel S. Pilli, and Ramesh C. Joshi. "Live virtual machine migration techniques: Survey and research challenges." 2013 3rd IEEE international advance computing conference (IACC). IEEE, 2013 (Year: 2013).*

Liu, Haikun, et al. "Live migration of virtual machine based on full system trace and replay." Proceedings of the 18th ACM international symposium on High performance distributed computing. 2009 (Year: 2009).*

* cited by examiner

Primary Examiner — Andrew T McIntosh
(74) Attorney, Agent, or Firm — Larson Newman, LLP

(57) ABSTRACT

An information handling system receives data from a sensor and an Internet-of-Things (IoT) device, and trains a machine learning model based on the data. The system also predicts an outcome that includes a future corrosion level of the information handling system using the trained machine learning model, and determines whether to move a virtual machine hosted in the information handling system to another information handling system based on the future corrosion level of the information handling system and another future corrosion level of the other information handling system.

20 Claims, 5 Drawing Sheets

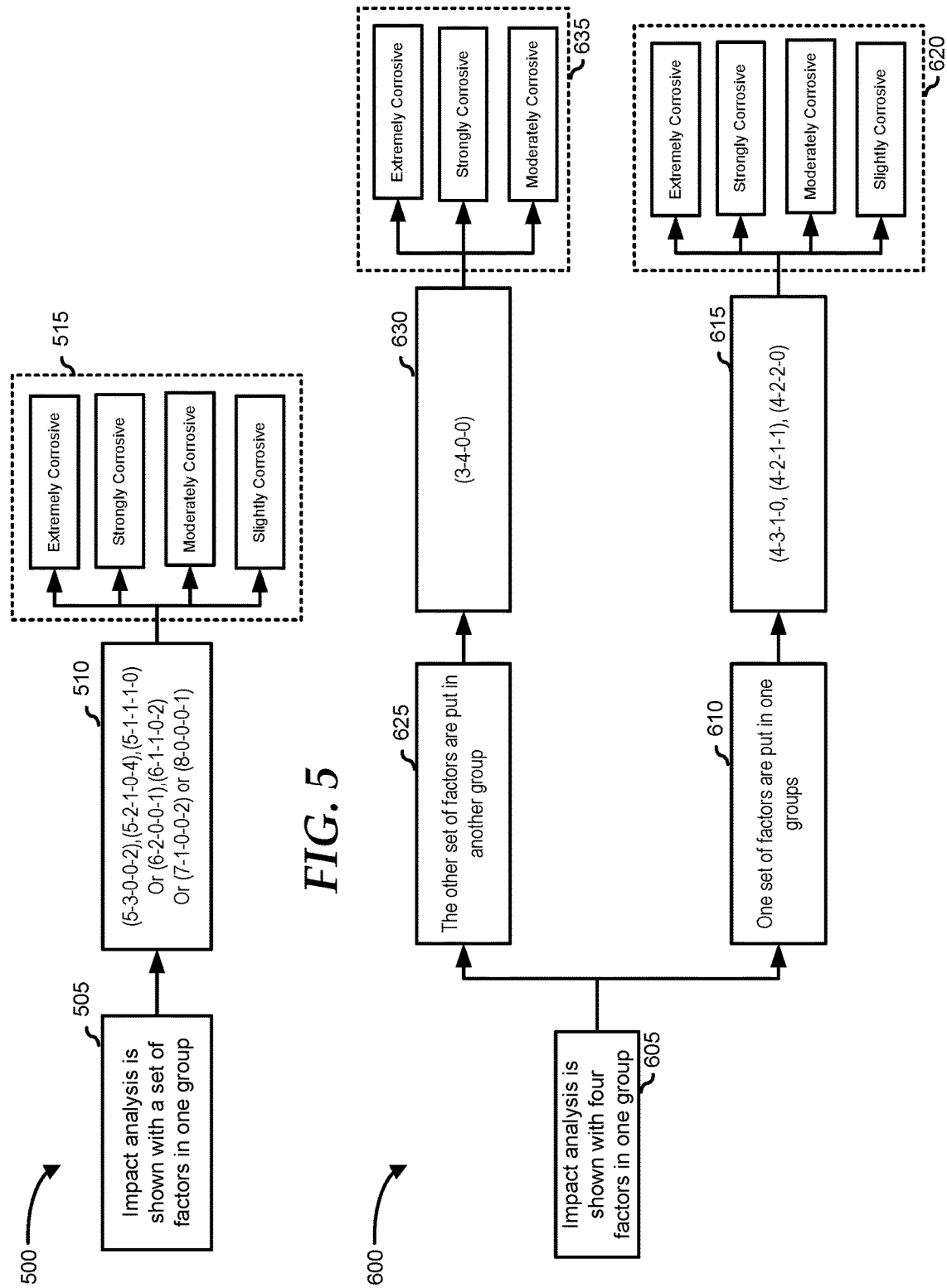

SYSTEM AND METHOD FOR IMPROVING RELIABILITY OF AN INFORMATION HANDLING SYSTEM

The present disclosure generally relates to information handling systems, and more particularly relates to improving the reliability of an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system receives data from a sensor and an Internet-of-Things (IoT) device, and trains a machine learning model based on the data. The system also predicts an outcome that includes a future corrosion level of the information handling system using the trained machine learning model, and determines whether to move a virtual machine hosted in the information handling system to another information handling system based on the future corrosion level of the information handling system and another future corrosion level of the other information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a block diagram illustrating an example of a system for improving the reliability of an information handling system, according to an embodiment of the present disclosure; and FIG. 6 is a block diagram illustrating an example of a system for improving the reliability of an information handling system, according to an embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
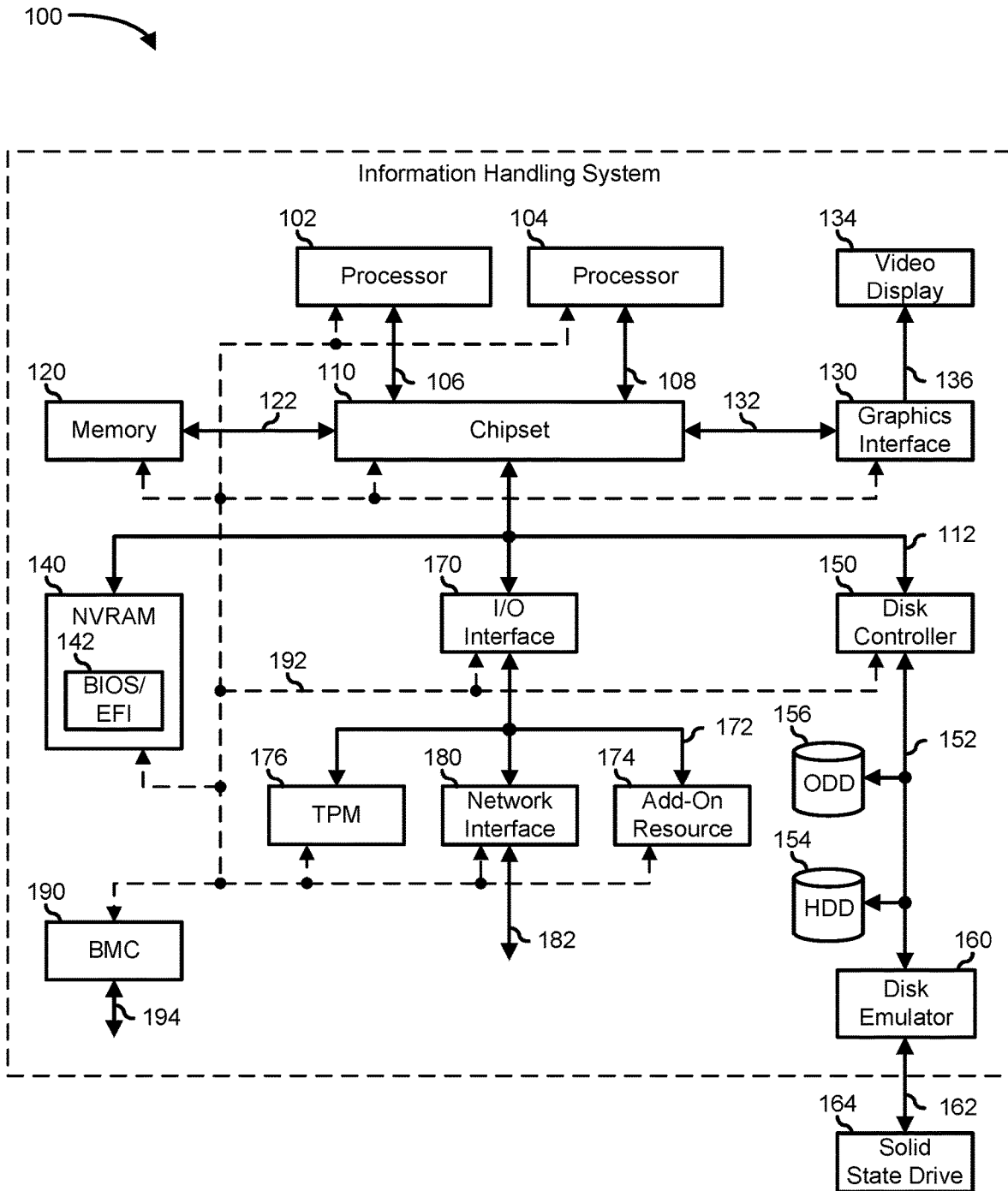
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM), Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board assembly (PCBA). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniB and channel, a Fibre Channel, a Gigabit Ethernet channel, proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Most electronic devices are susceptible to degradation over time from exposure to atmospheric contaminants, pollutants, humidity, and from residual assembly fluxes and chemicals. Atmospheric contaminate levels vary across geographic regions and environmental control conditions of an installation. Heavily industrialized areas, chemical plant installations, outside free air cooling installations, and high humidity coastal installations have a higher incidence of corrosion-related issues on electronics that result in increased service calls, returns, warranty costs, data loss, fires, user dissatisfaction, etc.

In areas with high degrees of pollution and in toxic industrial environments, accelerated corrosion has been observed in the PCBAs of information technology (IT) equipment. Elevated humidity levels from adiabatic cooling and air-side economization can exacerbate corrosion even when only low levels of pollutants are present. This generally occurs in regions with high levels of prevailing humidity such as Asia, Australia, the southeastern United States, and South America. Once the IT equipment failure begins, it is usually too late to reverse the impact of corrosion. Corrosion of PCBAs from air pollution is a known IT equipment failure mechanism and restricts the customer's ability to take advantage of energy-saving cooling technologies such as fresh air or free cooling with outside air.

Extending the life of the IT equipment by addressing the corrosion issue generally includes preventing or detecting the corrosion before it damages the IT equipment. Preventing the corrosion, such as by the use of a conformal coating, can be expensive or prohibitive depending on the requirements of the material to be protected. The conformal coating is expensive and generally used when there is significant corrosion risk, such as in marine or military equipment, and the cost structure of the product supports the expense.

Detecting the corrosion may include a secondary mechanism to monitor the IT equipment and notify the user before the IT equipment fails. Failing to detect the corrosion in time can result in data loss, downtime, and decreased availability, reducing the reliability of the IT equipment. By being able to address the corrosion issues of the IT equipment, manufacturers would be able to reduce warranty and service costs. Systems and methods described herein are provided to address the aforementioned issues and other concerns in increasing reliability and life expectancy of the IT equipment.

Figure 2:
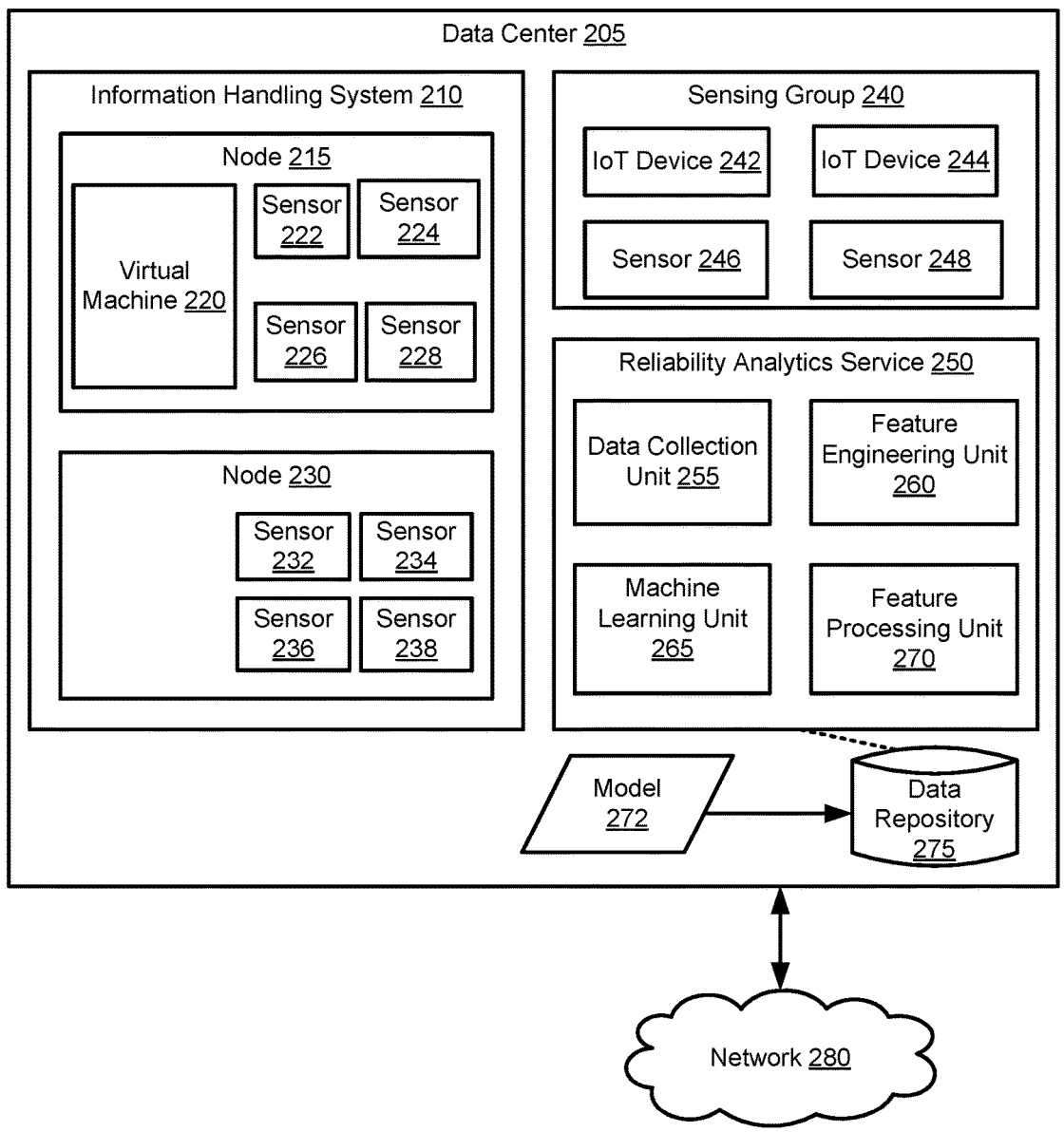
FIG. 2 is a block diagram illustrating an example of a system for improving the reliability of an information handling system, according to an embodiment of the present disclosure.

FIG. 2 shows an environment 200 for increasing availability by improving the reliability of an IT equipment as a service. Environment 200 includes a data center 205 and a network 280. Datacenter 205 includes an information handling system 210, a sensing group 240, a reliability analytics service 250, and a data repository 275. Information handling system 210 may be an IT equipment similar to information handling system 100 of FIG. 1. Information handling system 210 includes a node 215 and a node 230. Node 215 includes a virtual machine 220, a sensor 222, a sensor 224, a sensor 226, and a sensor 228. Node 230 includes a sensor 232, a sensor 234, a sensor 236, and a sensor 238. Sensing group 240 includes an Internet-of-Things (IoT) device 242, an IoT device 244, a sensor 246, and a sensor 248. Reliability analytics service 250 includes a data collection unit 255, a feature engineering unit 260, a machine learning unit 265, and a feature processing unit 270.

Various components within a chassis enclosure of information handling system 210 such as a PCBA, microcontroller, battery, CPU, power supply, etc. may be monitored by one or more sensors to detect corrosion. The corrosion may be detected by monitoring changes of factors such as temperature, humidity, the electrical resistance of the aforementioned components, etc. By detecting the corrosion, the life of the information handling system may be extended. Monitoring may be performed by reliability analytics service 250 based on the data collected and/or received from various sensors and/or IoT devices. A sensor is a device that detects or measures a physical property, indicates, or otherwise responds to it. An IoT device capture data from interactions with the environment, with other machines, with humans or other living things, and make it available for transmission over a network.

The system and method may be implemented as an "early warning system" to detect corrosion and to issue a corrosion warning to a user or another entity improving the reliability of the IT equipment and increasing the availability of the virtual machine it hosts. In such a case, the user or the entity may react to such a warning by, for example, to service the information handling system or to move a virtual machine to another node or server. By moving a virtual machine to a dormant machine, it improves the reliability service of the data center with decreased downtime of the virtual machine because of corrosion issues of the host server. Datacenter 205 may be a dedicated space within a building or a group of buildings used to house computer systems and associated components, such as telecommunications and storage systems. In this example, data center 205 houses information handling system 210. Sensors may be mounted inside and/or outside the chassis of information handling system 210. Sensors that are mounted inside the chassis such as sensor 222, sensor 224, sensor 226, sensor 228, sensor 232, sensor 234, sensor 236, and sensor 238 provide ambient conditions of the air inside information handling system 210. Sensors that are mounted outside the chassis, such as sensor 246 and sensor 248 provide ambient conditions of the air outside of information handling system 210. The sensors may also be mounted inside and/or outside data center 205.

Sensor 222, sensor 224, sensor 226, sensor 228 may be used to continuously track or monitor one more data associated with node 215 and/or information handling system 210. The sensors may be positioned inside a chassis enclosure of a device that includes electronic circuitry, such as information handling system 210. Examples of such devices include non-portable or portable information handling systems such as a server, a computer workstation, a notebook computer, a tablet computer, a smartphone, etc. Sensor 232, sensor 234, sensor 236, sensor 238, may be used to continuously track or monitor one more data associated with node 230 and/or information handling system 210. Sensor 246 and sensor 248 may be used to continuously track or monitor one more data associated with information handling system 210 and data center 205. The data to be tracked or monitored include temperature, relative humidity, air velocity, pH level, dust, etc. The sensors may also be used to detect a condition, such as corrosion of a component of the information handling system. Sensor 222, sensor 232, and sensor 246 may be temperature sensors. Sensor 224, sensor 234 may be humidity sensors. Sensor 226 and sensor 236 may be air velocity sensors. Sensor 228 and sensor 238 may be corrosion sensors. Corrosion may also be a function of temperature, relative humidity, air velocity also referred to as airflow, and/or other factors.

A corrosion sensor may be configured to detect corrosion data such as corrosion rate and/or total amount of corrosion that has occurred in corrosion sensitive components such as electronic circuits of information handling system 210. The corrosion sensor may be exposed to corrosive conditions such as conditions that contain contaminants, pollutants, humidity, particulates, etc. An air velocity sensor detects the velocity of a flow of ambient air moving from the outside into the interior of the information handling system. A temperature sensor detects the temperature at least one of: the IT equipment, the intake air, the outside air; and the IT compartment. A relative humidity sensor detects the amount of water vapor present in air expressed as a percentage of the amount needed for saturation at the same temperature.

Sensing group 240 includes one or more IoT devices and/or sensors to provide data associated with temperature, relative humidity, air velocity, pH level, airborne contaminants or particulates, dust, etc. outside of information handling system 210 and inside data center 205 or a building. For example, consider a use case of environmental monitoring of data center 205. Assume that there are sensors and/or IoT devices installed throughout the building to monitor temperature, pollution, humidity, etc. An IoT device is a thing or object that promotes collection and exchange of data among the other things or objects. IoT device 242 and IoT device 244, which may include one or more sensors, may be used to continuously track or monitor aforementioned data and make it available for transmission over a network such as network 280. IoT device architectures generally vary widely from one IoT device to another IoT device. Generally speaking, IoT devices range from legacy sensors and actuators such as interfaced via adaptors, hubs, or other circuitry that provides network connectivity to sophisticated embedded devices.

The sensors and IoT devices are configured to collect data which may be transported for aggregation and/or analysis by reliability analytics service 250, in particular by data collection unit 255. The data may be transported over communication protocols such as transmission control protocol/internet protocol (TCP/IP) and may be transformed into a data format like JavaScript Object Notation (JSON) or extensible markup language (XML). Reliability analytics service 250 may be configured to perform data analytics as a service for increasing reliability of information handling system 210 and/or virtual machine 220. Data analytics includes data collection, organization, storage, and analysis. Data analysis takes the aggregated data and turns it into operational insights by applying context specific algorithms, rules, and predictive machine learning models or simply models. In most deployments, data analytics may include feedback capabilities so that the models get better over time in some cases. The data analytics may be run within the environment or remotely such as in the cloud. Various technology protocols that may be used to transport the collected data including building and automation networks (BACnet), ZigBee, Bluetooth low energy, Wi-Fi, etc. It should be emphasized that IoT deployment depicted herein is for illustration purposes only. There are virtually infinite configurations possible in any given IoT deployment. It is often desirable that a given IoT installation remains flexible so that new and different IoT devices, gateways, switches, access points, etc. may be added. In one embodiment, reliability analytics service 250 may employ machine learning in implementing the present disclosure. In another embodiment, reliability analytics service 250 may include a policy engine which employs policies and/or rules in implementing the present disclosure. The policies may be implemented on an individualized basis for a specific node or information handling system. The policies may also be implemented on an enterprise level, on a data center level, a building level, a group of buildings, etc.

Data collection unit 255 may be configured to collect and/or receive data from the sensors and IoT devices. Subsequent to collecting and/or receiving the data, the data may be stored in data repository 275. Data repository 275, which is communicatively coupled to reliability analytics service 250, may be configured to store data obtained or received from the sensors and/or IoT devices. Data repository 275 may be configured to store model 272, which may be a machine learning model such as a predictive model, a reliability service model, a failure analytics model, etc. In addition, data repository 275 can store instructions, policies, rules, reports, algorithms, etc. associated with data analytics performed by reliability analytics service 250. A model may represent standard sample or signature of each class, function, factor, or feature which are used for the identification of any of the new class, function, factor, or feature. Data repository 275 may be persistent data storage device which may include NV-RAM, solid state disks, hard disk drives, magnetic tape libraries, optical disk drives, magneto-optical disk drives, compact disk drives, compact disk arrays, disk array controllers, and/or any computer-readable medium operable to store data. The data may be stored in various formats such as a text file, an XML file, a table, etc.

Feature engineering unit 260 may be configured to receive and process input data from various sensors and/or IoT devices. Feature engineering unit 260 can impute missing or desired values of inputs, features, and attributes; remove outlier values that are not needed. Feature engineering unit 260 may also convert input values to desired format such as from numerical to categorical. Feature engineering unit 260 can also detect and handle outliers such as drop data that deviates from the standard values by a certain threshold. For certain embodiments, input is provided to feature engineering unit 260 from data collection unit 255.

Machine learning unit 265 may be configured to classify a node and/or information handling system based on corrosion levels. Machine learning unit 265 may also be configured for binary classification analysis between two possible actions, that is whether to move virtual machine 220 or not. A machine learning algorithm suitable for such classifications may be used such as logistic regression techniques, linear discriminant analysis, linear regression analysis, ratification neural networks, or classification/regression trees.

In various other embodiments, machine learning unit 265 may employ Naïve Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine an impact between an influencing factor and/or a degree to which such an influencing factor affects a predictive outcome. Several of the latter algorithms may establish a model with training data for generating the predictive outcome. Boosting may be used with decision trees in one aspect whereas learning vector quantization may be used with artificial neural network algorithms.

In certain embodiments, machine learning unit 265 receives processed inputs, features and attributes from feature engineering 214. Machine learning unit 265 applies a machine learning model to recommend whether to move virtual machine 220 from node 215 to node 230 or another information handling system. The decision to move virtual machine 220 may be based on a predicted corrosion level of node 215 and node 230. In certain implementations, inputs, features, factors, and attributes are processed through various layers to further refine and determine which inputs, features, factors, and attributes can be modified to improve the recommendation metrics. In one embodiment, a location on where to move virtual machine 220 may be selected to ensure a base level of heat throughout the deployment of virtual machine 220. A minimum heat level may drive down the relative humidity and related corrosion risks. The selected location of virtual machine 220 may be based on a predicted temperature profile of the selected location.

Feature processing unit 270 may be configured to receive data from sensors and/or IoT devices and generate weight-based interaction ranking information as depicted in FIG. 5 and FIG. 6. The generated weight-based interaction ranking information may be used to validate a trained machine learning model. Feature processor may also utilize a weight-based ranking system that provides information such as impacts of various factors to a given model or to its interactions with the other factors. Feature processing unit 270 may be configured to apply feature processing techniques to analyze the data acquired by the set of sensors and IoT devices. Based on the information in the data sets, each factor may be assigned a measurable value such as on a normalized scale or a spectrum of possible values. A weighting value may be applied to each of the factors that may be used to train a model for a predictive outcome.

Network 280 may use any one or more of a variety of networks or another type of communication connection as known to those skilled in the art. The type of communication connection used may vary with certain system parameters and requirements, such as those related to bandwidth and throughput required in accordance with a rate of data requests as may be issued by information handling system 210. The communication connection may be a network connection, bus, and/or another type of data link, such as a hardwire connection, a network cable, wireless or WiFi® protocols, or other connections known in the art.

Figure 3:
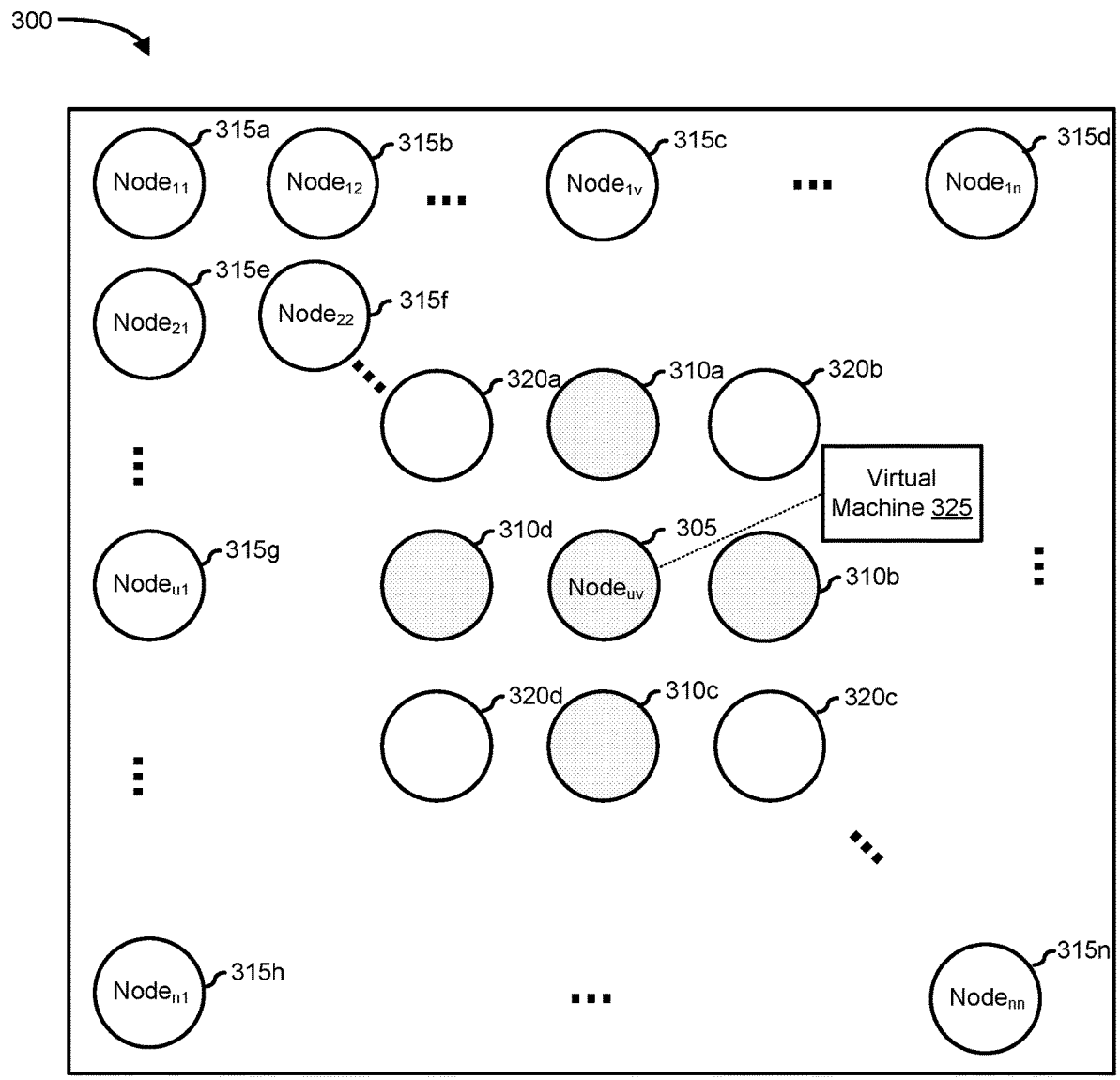
FIG. 3 is a block diagram illustrating an example of a system for improving the reliability of an information handling system, according to an embodiment of the present disclosure.

FIG. 3 shows an environment 300 where systems and methods for increasing availability of an information handling system by improving its reliability as a service may be implemented. Environment 300 may be a data center, a building, or a group of buildings that includes a plurality of nodes such as node 305, node 310a to node 310d, node 315a to node 315n, and node 320a to node 320d. A node is a single computer in an information handling system which may include one or more processors. For example, node 305 and nodes 310a to 310d may be nodes in an information handling system. In this example, node 305 hosts a virtual machine 325. The nodes may be represented in a matrix during the analysis.

The systems and methods discussed herein may utilize IoT device and sensor data analytics to use dormant, cooler system regions of environment 300 to predictably to extend the life expectancy of an information handling system or IT equipment. Using the dormant and/or cooler system regions may be based on virtual machine mappings to a physical location of the information handling system or IT equipment. This allows the use of the information handling systems or IT equipment in the dormant and/or cooler regions to host virtual machines instead of the current host as reliability service to the data center, which may be based upon a prediction that a current host of the virtual machine is highly corrosive and thus at risk of failure. By moving the virtual machine from a server that is classified as highly corrosive to a server that is classified as moderately corrosive, the reliability that the virtual machine may operate without interruption is increased.

In another embodiment, moving the virtual machine may be time-based. For example, even if a first server is classified as not corrosive, the virtual machine may be moved to a second server if the length of time that the first server has hosted the virtual machine exceeded a threshold. It may have been determined that the virtual machine should be moved to a different server every three months irrespective of the corrosive prediction of the first server. In addition, moving the virtual machine may also be based on the location of the host and/or the location of the new host of the virtual machine.

Figure 4:
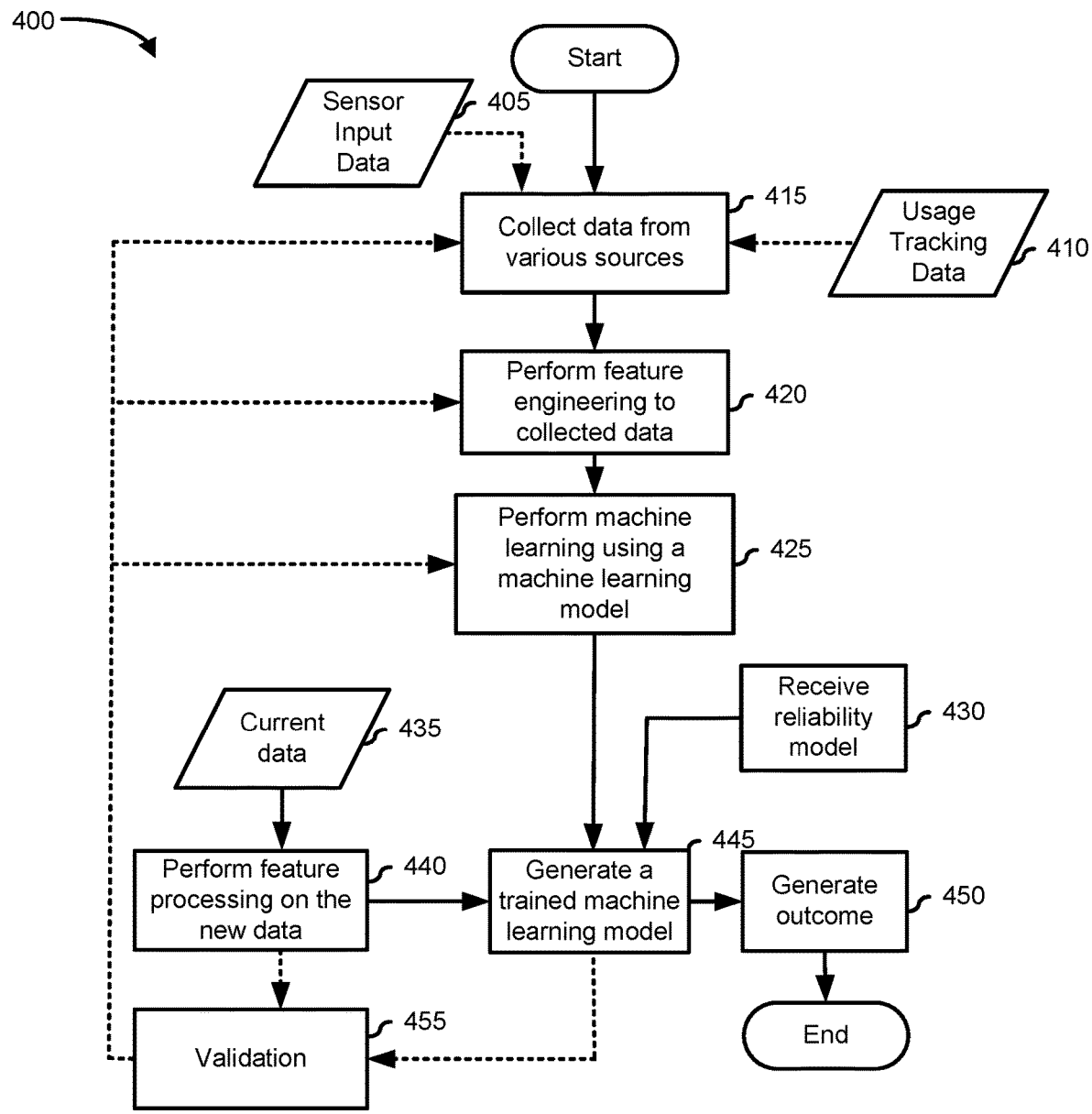
FIG. 4 is a flowchart illustrating an example of a method for improving the reliability of an information handling system, according to an embodiment of the present disclosure.

The decision to move the virtual machine may be based on a prediction based on a trained machine learning model as discussed in FIG. 4. In another embodiment, the decision to move the virtual machine may be based on one or more policies. The policy may include one or more rules in predicting the future state of a node, an information handling system, or an IT equipment. The decision on whether to move virtual machine 325 may be based on one or more factors such as time threshold and/or conditions of the node 305. The conditions of node 305 may include its corrosion level, temperature, humidity, pH level, etc. The decision may also be based on a combination of the aforementioned factors. For example, if virtual machine 325 has to be moved to a different host every four months, and the virtual machine 325 has not been moved in the last four months then virtual machine 325 may be moved to another node.

The machine learning algorithm and/or policy may also include a rule that the virtual machine may be moved to the nearest node to the current node that is hosts the virtual machine, wherein the nearest node should also pass certain criteria. For example, the nearest node should not be highly corrosive and has a nominal humidity and temperature levels among others. Here, node 310a, node 310b, node 310c, and node 310d may be identified as the nearest nodes to node 305. However, if these nodes are classified as highly corrosive, then the next nearest node may be identified, such as node 320a, node 320b, node 320c, and node 320d. If these nodes do not pass certain criteria, then the next order of nearest nodes may be identified, and so on. In another embodiment, the machine learning algorithm and/or policy may include a rule that virtual machine 325 should be moved to the farthest node that pass the criteria. For example, node 315a, node 315b, 315c, and 315d may be identified as the farthest nodes from node 305 and candidates for hosting virtual machine 325. In yet another embodiment, the policy may include a rule that determines whether the nodes pass the criteria before determining the nearest nodes.

In one example, if a first server which currently hosts the virtual machine is classified as highly corrosive, then the virtual machine may be moved to either a second server or a third server. Further analysis or comparison between the second server and the third server may be performed before moving the virtual machine. For example, if being close to the cooling system is important and assigned a greater weight, and then the virtual machine may be moved to the second server instead of the third server.

FIG. 4 shows a flowchart of a method 400 for improving reliability of an information handling system or IT equipment. Method 400 utilizes a multi-tier classification approach, wherein several order of inputs are utilized in generating a predictive outcome. Method 400 may be performed by one or more components of a reliability analytics service such as reliability analytics service 250 of FIG. 2. While embodiments of the present disclosure are described in terms of environment 200 of FIG. 2, it should be recognized that other systems may be utilized to perform the described method.

Method 400 typically starts at block 415, where the method may collect sensor input data 405 and usage tracking data 410. The method may also receive sensor input data 405 and usage tracking data 410 from the sensors and IoT devices via a push capability of the sensors and IoT devices. Sensor input data 405 are supervised inputs which reports more than two states to a monitoring device such as reliability analytics service 250 of FIG. 2. For example, a temperature sensor can report the degree of hotness and coldness of a particular node in the information handling system or the IT equipment. Usage tracking data 410 are semi-supervised data which combines a small amount of labeled data with a large amount of unlabeled data. Usage tracking data 410 may be used to train a failure analytics model, wherein the trained failure analytics model may also be collected as part of the input. The failure analytics model include insight on how the prior predictions failed. Sensor input data 405 may be aggregated with usage tracking data 410 subsequent to the collection. Sensor input data 405 and usage tracking data 410, which may be historical data over a period, provide $1^{st}$ order input information used in training a machine learning model.

The method proceeds to block 420, where the method applies feature engineering to the collected sensor input data 405 and usage tracking data 410. Feature engineering includes pre-processing the collected data to make it compatible with the requirements of the model learning performed at block 425. For example, feature engineering may impute default values to missing values in a column, such as use default value of zero for a column instead of N/A (not applicable). The method proceeds to block 425.

At block 425, the method trains or performs machine learning on the machine learning model. The machine learning model conceptualizes the functional relationship between the corrosion and the observations like ambient temperature, relative humidity, and pH levels in the information handling system. The machine learning model may be a predictive model that may be trained using sensor input data 405 and usage tracking data 410 that has been pre-processed at block 420 or a percentage thereof which may be referred to as training data. The algorithm used will learn patterns that map the variables to the target, and it will generate a trained machine learning model that captures these relationships.

At block 440, the method receives current data 435 from various sensors, which may be internal or external of one or more IT equipment. Current data 435 maybe the current or latest data detected by the sensors. Current data 435 from various sensors may be aggregated prior to block 440. The features of received current data 435 may be transformed or processed which may include grouping current data 435 into data sets according to the different factors. Feature processing may further measure the interrelation between two or more factors. The data sets of the factors may be further grouped as depicted in block 510 of FIG. 5. The grouping of current data 435 may be used in the classification of the node, information handling system, or IT equipment which may be fall into defined classifications based on the above factors. For example, an information handling system may be near a door and thus may tend to collect dust which may increase its chances of increased heat and corrosion. A group of data based on the dust factor may be determined and based on this factor predict a corrosion level, such as highly corrosive, moderately corrosive, or non-corrosive, of the node, information handling system, or IT equipment. For example, a machine learning classifier maybe use to predict a classification based on the corrosion level.

At block 445, the method generates trained machine learning model based on the aforementioned data and current data 435. The current data 435 may be the latest data received from one or more sensors and IoT devices may be used as $2^{nd}$ order input information. The data may be received in real time prior to performing block 445. Method 400 may process features of current data 435 prior to transmitting the processed data to block 445. Generating the trained machine learning model at block 445 may also include an IoT model also referred to as reliability model which is a function of corrosion levels, airflow, humidity, and temperature from data provided by IoT devices external from the IT equipment. The data provided by IoT devices, may be unsupervised data and are used as $3^{rd}$ order input information. For example, a cooling system in one section of the data center may have failed that day, so temperature may be high of some servers in the section where the cooling system failed. By including this information, when predicting the outcome, those aforementioned servers may be excluded as potential new hosts for the virtual machine. The reliability model is received at block 430 prior to performing block 445. The machine learning model includes three types of data and a minimized reliability model which is a function of corrosion levels, airflow, humidity, and temperature.

At block 450, the method uses the trained machine learning model can then be used to generate predictions also referred to as outcomes based on current data 435. The method may use data from various factors such as level of corrosives, humidity, temperature, airflow, etc. as $2^{nd}$ order input into a supervised machine learning model that was earlier trained on a different set of data from one or more of the aforementioned factors as $1^{st}$ order input, a predicted outcome may be generated. Generating the predictive outcome may also utilize data from external IoT devices as $3^{rd}$ order input. The predictive outcome may include a binary classification on whether or not to move a virtual machine.

In another embodiment, the binary classification may be whether to move or initialize the virtual machine. The binary classification may be a function of the location of the virtual machine in association with its predicted future state, such as predicted corrosion level. The outcome may include a virtual machine mapping to a physical location of the information handling system. The predictive outcome may also include the next location of the virtual machine, which may be a function of the current location. For example, the next location may be the nearest location to the current location with a nominal corrosion level. In another embodiment, the outcome may be determined using one or more policies based on a plurality of factors described above.

As corrosion escalates the structural heath of an IT equipment may be affected which could lead to the deterioration of its components and consequential structural failure. By being able to classify the corrosiveness of the IT equipment, measures may be taken such that the risk structural failure is averted extending the life expectancy. For example, subsequent to moving a virtual machine from a first server to a second server, the first server may be serviced by technicians who may mitigate issues regarding its level of corrosion, thus increasing the life expectancy of the first server.

The trained machine learning model may be validated at block 455 based on the current data 435 received and that processed at block 440 respectively, in order to make a determination on the accuracy of the prediction. The validation may be used to determine as to whether the generated outcome at block 450 is within sufficient accuracy. In this manner, a feedback loop may be implemented, wherein the machine learning model may be adjusted based on the accuracy of the generated outcome. Here, the feedback loop provides feedback information to block 415, block 420, and block 425. For example, at block 420 the current data may show some gradient change regarding the corrosion level of a particular machine. This information may be included at block 425. A machine that may have previously been excluded as a possible host of the virtual machine may now be included based on the improvement of its corrosion level, in one example.

FIG. 5 shows a flow diagram of a portion of an exemplary process 500 for improving reliability of an information handling system. In particular, process 500 shows a classification process of nodes or information handling systems. It is to be understood that this particular process is only an example, and that additional or alternative processes for classification of software scripts can be carried out in other embodiments.

The node, information handling system, or IT equipment may be classified according to predictive corrosion levels which may be the basis of the binary classification. Various techniques may be used to gather and aggregate data to be used in classification of the corrosion levels of the IT equipment. Classification may begin by gathering data across a large sample set of a population IoT devices and sensors. The data may include information associated with the various corrosion factors discussed above which provides information regarding the current and/or future state of corrosion of each one of the servers. These factors may then be incorporated into a machine learning classification algorithm, such as K-Nearest neighbors, logistic regression, decision trees, Naïve Bayes algorithm or the like.

The gathered and/or aggregated data may be categorized into groups with similar properties or features. For example, there may include group of data associated with being highly corrosive, moderately corrosive, or non-corrosive. If every factor of a first server is very high, and then the first server may be classified as highly corrosive. While, a second server may be close to a cooling system which provides has better airflow so air velocity is nominal, the pH level is nominal, and the temperature is moderate. Based on the values of the aforementioned factors, the second server may be classified as moderately corrosive. A third server may be idling wherein internal cooling fans are off so air velocity is stagnant and the temperature is low, and the pH level is nominal. Based on the values of the aforementioned factors, the third server may be classified as moderately corrosive.

Corrosion protection methods may include change in coating, design improvement, a change in the metal used, and a change of environment. The change of environment includes removal of corrosive constituents, addition of corrosion inhibitors, and change in operative factors such as temperature, air flow, and pH levels. As the air flows through the server, the air may "wet" a metal surface with a layer of water several molecules thick. The thickness of the layer varies as a function of relative humidity and temperature. In addition, it has been observed that thermal cycling may induce corrosion in metal objects. While pH levels may alter the corrosion resistance of a material. Other factors that affect corrosion may include relative humidity, pollutants such as sulfur dioxide and nitrogen oxides which are gaseous products of fuel combustion.

In this example, process 500 includes block 505, block 510, and block 515. Process 500 may be performed by a reliability service controller. Process 500 typically starts at block 505, wherein the number of factors in one group is identified. In this example, there are more than four factors in one group. After determining that there are more than four factors in one group, then process 500 determines values for data set at block 510 which may be used in the decision making process at block 515.

Block 510 shows four sets of groups—first set{(5-3-0-0-1), (5-2-1-0-4), (5-1-1-1-0); second set—{(6-2-0-0-1), (6-1-1-0-2)}; third group set—{(7-1-0-0-2)}, and fourth group set {(8-0-0-0-2)}. Here, the first group set includes three groups, wherein each group includes data values that show impact of a factor to the other three factors in a set. A weight-based ranking system maybe used to assign a weight to each factor based on the factor's impact. A weight may be assigned based on the interaction of the factor to the machine learning model or other factors. It may be assumed that the larger weight value the higher the degree of impact of the factor. For example, the factors in the first values of the first group includes, dust, temperature, air velocity, pH level, and humidity. The first value is associated with the assigned numeric value to the first factor. Regarding the first group in the first set: (5-3-0-0-1) dust is assigned the numeric value of five. The value of three is the degree of impact of dust to temperature, while the first zero is the degree of impact of air velocity to dust. The second zero is the degree of impact of pH level to dust, while the last value of two is the degree of impact of dust to humidity. In another example, the factors in the second values of the first group include dust, humidity, cooling, pH level, and corrosion. The second set of values: (5-2-1-0-4) depicts that numeric value of the impact of humidity to dust is two, while the impact of cooling is rated at one, the impact of pH level is rated at zero, and the impact of corrosion is rated at four.

Each group may be evaluated and results in a classification of the corrosiveness level of a node or an information handling system as depicted in block 515. For example, the node or the information handling system may be classified as extremely corrosive based on the evaluation of the first group. The node may be classified as strongly corrosive based on the evaluation of the second group and moderately corrosive based on the evaluation of the third and fourth groups. Based on the above classifications, the node may have a final classification of strongly corrosive.

FIG. 6 shows a flow diagram of a portion of an exemplary process 600 for improving reliability of an information handling system. In particular, process 600 shows a classification process of nodes or information handling systems. It is to be understood that this particular process is only an example, and that additional or alternative processes for classification of software scripts can be carried out in other embodiments.

In this example, process 600 includes block 605, block 610, block 615, block 620, block 625, block 630, and block 635. Process 600 may be performed by a reliability service controller similar to reliability analytics service 250 of FIG. 2. Process 600 typically starts at block 605, wherein the number of factors in one group is identified. In this example, there are there are a total of eight factors for analysis, which are divided into two sets each with four factors. For example, the first set includes factors associated with data received from various sensors, while the second set includes factors associated with data received from IoT devices. In another example, the first set includes factors associated with data received from sensors or IoT devices located in the information handling system, while the second set includes factors associated with data received from sensors and IoT devices located outside of the information handling system such as at a data center that houses the information handling system.

At block 610, one set of factors are put in different groups as shown in block 615 where the four factors are put in three different groups. Similar to block 610, at block 625 another set of factors are put in a group as shown in block 630. The values in the groups in block 615 and block 630 depict an impact to the factors in the group, so a set factors are analyzed in block 615 and another set of factors are analyzed in block 630.

At block 630, similar to block 615, each group may be evaluated and the evaluation may result in a classification of the corrosiveness level of a node or an information handling system as depicted in block 635. An analysis of the values in the group may result in a classification of the node or the information handling system as extremely corrosive, strongly corrosive, moderately corrosive, or slightly corrosive. In addition, the further analysis based on the classification based on block 620 and the classification based on block 635 may be performed. For example, if the node is classified as moderately corrosive at block 620 and slightly corrosive at block 635, the final classification of the node may be moderately corrosive if a higher weight is assigned to the classification results of block 620 compared to the weight assigned to the classification results of block 635.

Although FIG. 4 show example blocks of method 400 in some implementation, method 400 may include additional blocks, fewer blocks, different blocks, or differently arranged blocks than those depicted in FIG. 4. Additionally, or alternatively, two or more of the blocks of method 400 may be performed in parallel. For example, block 450 and block 455 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
receiving, by a hardware processor, sensor data, an Internet-of-Things (IoT) device data, and usage tracking data;
training a machine learning model based on the sensor data, the IoT device data, and the usage tracking data to generate a trained machine learning model;
predicting an outcome that includes a future corrosion level of an information technology (IT) equipment in an information handling system using the trained machine learning model, wherein the predicting the outcome is based on the sensor data, the IoT device data, and the usage tracking data, wherein the outcome includes a next location of a virtual machine, wherein the next location is another information handling system that is nearest to the information handling system, and wherein the another information handling system has a nominal corrosion level;
generating a binary classification on whether to move the virtual machine hosted by the information handling system to the another information handling system, wherein the binary classification is based on the future corrosion level of the IT equipment; and
determining whether to move the virtual machine from the information handling system to the another information handling system based on the binary classification.

2. The method of claim 1, wherein the determining whether to move the virtual machine is further based on a period of time that the IT equipment has hosted the virtual machine.

3. The method of claim 1, wherein the data includes information associated with humidity, temperature, and airflow.

4. The method of claim 1, wherein the machine learning model is supervised.

5. The method of claim 1, wherein the outcome includes a virtual machine mapping to a physical location of the IT equipment.

6. The method of claim 1, wherein the future corrosion level includes one of extremely corrosive, strongly corrosive, moderately corrosive, or slightly corrosive.

7. The method of claim 1, wherein the machine learning model is a reliability model that is a function of corrosion level, humidity, temperature, and airflow.

8. The method of claim 1, wherein the determining whether to move is based on a physical location of the IT equipment.

9. The method of claim 1, wherein another IT equipment is further selected based on another physical location of the another IT equipment.

10. An information handling system, comprising:
one or more processors;
a memory having code stored thereon that, when executed, performs a method including:
receiving-sensor data, an Internet-of-Things (IoT) device data, and usage tracking data;
training a machine learning model based on the sensor data, the IoT device data, and the usage tracking data to generate a trained machine learning model;
predicting an outcome that includes a future corrosion level of the information handling system using the trained machine learning model, wherein the predicting the outcome is based on the sensor data, the IoT device data, and the usage tracking data, wherein the outcome includes a next location of a virtual machine, wherein the next location is another information handling system that is nearest to the information handling system, and wherein the another information handling system has a nominal corrosion level;
generating a binary classification on whether to move the virtual machine hosted by the information handling system to the another information handling system, wherein the binary classification is based on the future corrosion level of the information handling system; and
determining whether to move the virtual machine hosted in the information handling system to the another information handling system based on the binary classification.

11. The information handling system of claim 10, wherein the determining whether to move the virtual machine is further based on a period of time that the information handling system has hosted the virtual machine.

12. The information handling system of claim 10, wherein the data includes information associated with humidity, temperature, and airflow.

13. The information handling system of claim 10, wherein the determining whether to move the virtual machine is further based on a location of the information handling system.

14. The information handling system of claim 10, wherein the outcome includes a virtual machine mapping to a physical location of the information handling system.

15. The information handling system of claim 10, wherein the another information handling system is further selected based on a location of the another information handling system.

16. A non-transitory computer-readable medium including code that when executed performs a method, the method comprising:
   receiving sensor data, an Internet-of-Things (IoT) device data, and usage tracking data;
   training a machine learning model based on the sensor data, the IoT device data, and the usage tracking data to obtain a trained machine learning model;
   predicting an outcome that includes a future corrosion level of information technology (IT) equipment in an information handling system using the trained machine learning model, wherein the predicting is based on the sensor data, the IoT device data, and the usage tracking data, wherein the outcome includes a next location of a virtual machine, wherein the next location is another information handling system that is nearest to the information handling system, and wherein the another information handling system has a nominal corrosion level;
   generating a binary classification on whether to move the virtual machine hosted by the information handling system to the another information handling system, whether the binary classification is based on the future corrosion level of the IT equipment; and
   determining whether to move the virtual machine hosted in the information handling system to the another information handling system based on the binary classification.

17. The non-transitory computer-readable medium of claim 16, wherein the determining whether to move the virtual machine is further based on a period of time that the IT equipment has hosted the virtual machine.

18. The non-transitory computer-readable medium of claim 16, wherein the determining whether to move the virtual machine is further based on a location of the IT equipment.

19. The non-transitory computer-readable medium of claim 16, wherein the machine learning model is a reliability model that is a function of corrosion level, humidity, temperature, and airflow.

20. The non-transitory computer-readable medium of claim 16, wherein another IT equipment is further selected based on a location of the another IT equipment.

* * * * *